United States Patent
Wang et al.

(10) Patent No.: US 10,026,355 B1
(45) Date of Patent: Jul. 17, 2018

(54) DISPLAY DEVICE AND PERIPHERAL CIRCUIT STRUCTURE THEREOF

(71) Applicant: E Ink Holdings Inc., Hsinchu (TW)

(72) Inventors: Henry Wang, Hsinchu (TW); Po-Hsin Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/885,845

(22) Filed: Feb. 1, 2018

(30) Foreign Application Priority Data

Aug. 15, 2017 (TW) .............................. 106127656 A

(51) Int. Cl.
*G09G 3/20* (2006.01)
*H02H 9/04* (2006.01)

(52) U.S. Cl.
CPC ............. *G09G 3/2092* (2013.01); *H02H 9/04* (2013.01); *G09G 2300/0426* (2013.01); *G09G 2310/0281* (2013.01); *G09G 2330/04* (2013.01)

(58) Field of Classification Search
CPC ....... G09G 2310/0281; G09G 2330/04; G09G 2300/0426; G09G 3/2092; H02H 9/04
See application file for complete search history.

(56) References Cited

U.S. PATENT DOCUMENTS

| | | | |
|---|---|---|---|
| 5,235,272 A | 8/1993 | Henley | |
| 5,459,410 A | 10/1995 | Henley | |
| 8,227,977 B2 | 7/2012 | Lhee et al. | |
| 8,499,428 B2 | 8/2013 | Wu | |
| 8,772,053 B2 | 7/2014 | Cheng | |
| 9,281,352 B2 | 3/2016 | Choi et al. | |
| 9,391,131 B2 | 7/2016 | Choi et al. | |
| 2010/0066383 A1 | 3/2010 | Chung et al. | |
| 2013/0050603 A1* | 2/2013 | Ise | G02F 1/134363 349/43 |
| 2016/0035811 A1 | 2/2016 | Choi et al. | |
| 2016/0218151 A1* | 7/2016 | Kwon | H01L 27/323 |

FOREIGN PATENT DOCUMENTS

| | | |
|---|---|---|
| TW | 200729452 A | 8/2007 |
| TW | 201530240 A | 8/2015 |

OTHER PUBLICATIONS

Corresponding Taiwan Notice of Allowance dated Dec. 19, 2017.

\* cited by examiner

*Primary Examiner* — Abbas Abdulselam
(74) *Attorney, Agent, or Firm* — CKC & Partners Co., Ltd.

(57) ABSTRACT

A display device includes a substrate and a peripheral circuit structure on the substrate. The peripheral circuit includes a common electrode layer between the ESD protection diode and a pixel unit of the substrate, an ESD protection diode, an isolation layer covering the common electrode layer, a first conductive line on the isolation layer and over the common electrode layer, and a second conductive line on the isolation layer and over the common electrode layer. Two ends of the first conductive line are respectively electrically connected to the ESD protection diode and the pixel unit. Two ends of the second conductive line are electrically connected to the first conductive line on positions that are between the ESD protection diode and the common electrode layer and between the pixel unit and the common electrode layer to respectively form a first junction and a second junction.

13 Claims, 5 Drawing Sheets

DISPLAY DEVICE AND PERIPHERAL CIRCUIT STRUCTURE THEREOF

RELATED APPLICATIONS

This application claims priority to Taiwan Application Serial Number 106127656, Aug 15, 2017, which is herein incorporated by reference.

BACKGROUND

Field of Invention

The present invention relates to a display device and a peripheral circuit structure of the display device.

Description of Related Art

In a display device, defects caused by electrostatic discharge (ESD) damages may often be formed on the signal input end and the signal terminal of the display device that may be referred to as peripheral circuits outside a display area. A conductive line in the peripheral area of the display device may electrically conduct a common electrode (Vcom) due to the process defect of an isolation layer, ESD damage, etc., in which the conductive line and the common electrode are at different layers. As a result, some pixel units cannot display in a normal way in the display device that have such a line defect.

A typical repairing method is that when one conductive line in a signal input end is damaged by ESD and the conductive line electrically conducts a underlying common electrode, the common electrode adjacent to two sides of the conductive line may be slit by laser, and hence a portion of the common electrode covered by the damaged conductive line is separated from other portions of the common electrode. However, when two conductive lines in the signal input end are damaged by ESD, if the two conductive lines are repaired by the aforesaid repairing method, a region of the common electrode between the two conductive lines is insulated with other conductive lines, thereby affecting the function of the common electrode under other normal conductive lines that are between the two damaged conductive lines. Moreover, since a distance for laser cutting is long (at least greater than the width of the common electrode), it is difficult to improve the successful rate of repair.

SUMMARY

An aspect of the present invention is to provide a display device.

According to an embodiment of the present invention, a display device includes a substrate and a peripheral circuit structure. The substrate has a display area and a peripheral area, and the display area has at least one pixel unit. The peripheral circuit structure is located on the peripheral area of the substrate, and includes a common electrode layer, at least one ESD protection diode, an isolation layer, a first conductive line, and at least one second conductive line. The common electrode layer is electrically connected to the pixel unit. The common electrode layer is located between the ESD protection diode and the pixel unit. The isolation layer covers the common electrode layer. The first conductive line is located on the isolation layer and over the common electrode layer. Two ends of the first conductive line are respectively electrically connected to the ESD protection diode and the pixel unit. The second conductive line is located on the isolation layer and over the common electrode layer. Two ends of the second conductive line are respectively located on positions that are between the ESD protection diode and the common electrode layer and between the pixel unit and the common electrode layer, and the two ends of the second conductive line are electrically connected to the first conductive line to respectively form a first junction and a second junction.

In one embodiment of the present invention, the second conductive line is substantially U-shaped when viewed from above.

In one embodiment of the present invention, the isolation layer is located between the first conductive line and the common electrode layer, and is located between the second conductive line and the common electrode layer.

In one embodiment of the present invention, the second conductive line has a first section, a second section, and a third section. Two ends of the third section respectively adjoin an end of the first section and an end of the second section, and the third section overlaps the common electrode layer, and the first section and the second section do not overlap the common electrode layer.

In one embodiment of the present invention, the third section of the second conductive line is substantially parallel to the first conductive line.

In one embodiment of the present invention, the first section and the second section of the second conductive line are substantially perpendicular to the first conductive line and the third section of the second conductive line.

In one embodiment of the present invention, the isolation layer has a through hole, and the second conductive line is in contact with the common electrode layer that is in the through hole, and the second conductive line has two gaps that are respectively between the first junction and the third section and between the second junction and the third section.

In one embodiment of the present invention, the isolation layer has a through hole, and the first conductive line is in contact with the common electrode layer that is in the through hole, and the first conductive line has two gaps that are respectively between the first junction and the common electrode layer and between the second junction and the common electrode layer.

In one embodiment of the present invention, a width of the first conductive line is substantially the same as a width of the second conductive line.

In one embodiment of the present invention, a longitudinal direction of the first conductive line is substantially perpendicular to a longitudinal direction of the common electrode layer.

In one embodiment of the present invention, the ESD protection diode includes two thin film transistors therein.

In one embodiment of the present invention, the peripheral circuit structure is a signal input end or a signal terminal of the display device.

An aspect of the present invention is to provide a peripheral circuit structure located on a peripheral area of a substrate, in which the peripheral area surrounds a display area of the substrate.

According to an embodiment of the present invention, a peripheral circuit structure includes a common electrode layer, at least one ESD protection diode, an isolation layer, a first conductive line, and at least one second conductive line. The common electrode layer is electrically connected to at least one pixel unit of the display area. The common electrode layer is located between the ESD protection diode and the pixel unit. The isolation layer covers the common electrode layer. The first conductive line is located on the isolation layer and over the common electrode layer. Two ends of the first conductive line are respectively electrically connected to the ESD protection diode and the pixel unit. The second conductive line is located on the isolation layer and over the common electrode layer. Two ends of the second conductive line are respectively located on positions that are between the ESD protection diode and the common electrode layer and between the pixel unit and the common electrode layer, and the two ends of the second conductive line are electrically connected to the first conductive line to respectively form a first junction and a second junction.

In the aforementioned embodiments of the present invention, since the peripheral circuit structure has the second conductive line that is over the common electrode layer, and the two ends of the second conductive line are electrically connected to the first conductive line to respectively form the first junction and the second junction, the second conductive line can be used as a spare conductive line when an electrical conduction is formed between the first conductive line and the underlying common electrode layer due to the process defect of the isolation layer or ESD damage. For example, when an electrical conduction is formed between the first conductive line and the underlying common electrode layer, a gap may be formed in the first conductive line that is between the first junction and the common electrode layer, and another gap may be formed in the first conductive line that is between the second junction and the common electrode layer. As a result, an electric current may merely pass through the second conductive line and not pass through the first conductive line. Similarly, when an electrical conduction is formed between the second conductive line and the underlying common electrode layer due to the process defect of the isolation layer or ESD damage, the first conductive line can be used as a spare conductive line.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
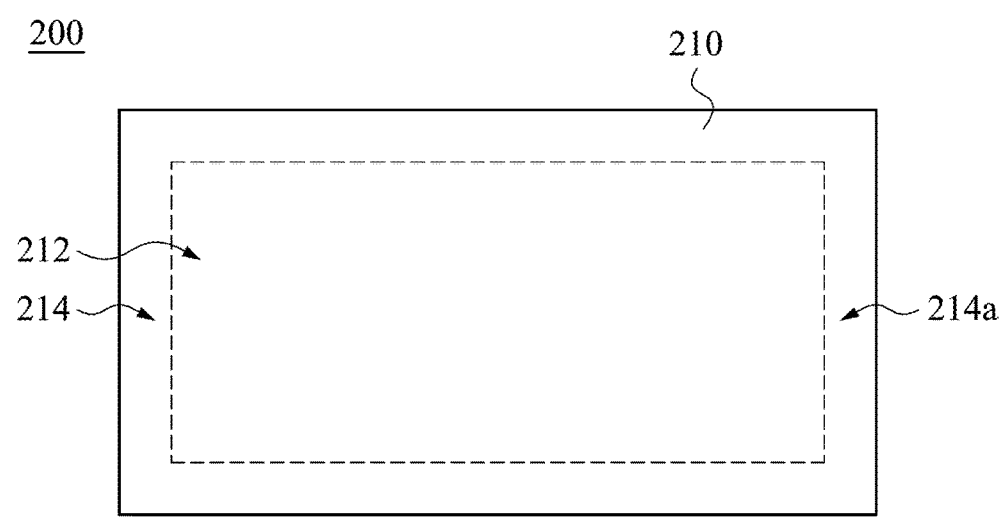
FIG. 1 is a top view of a display device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
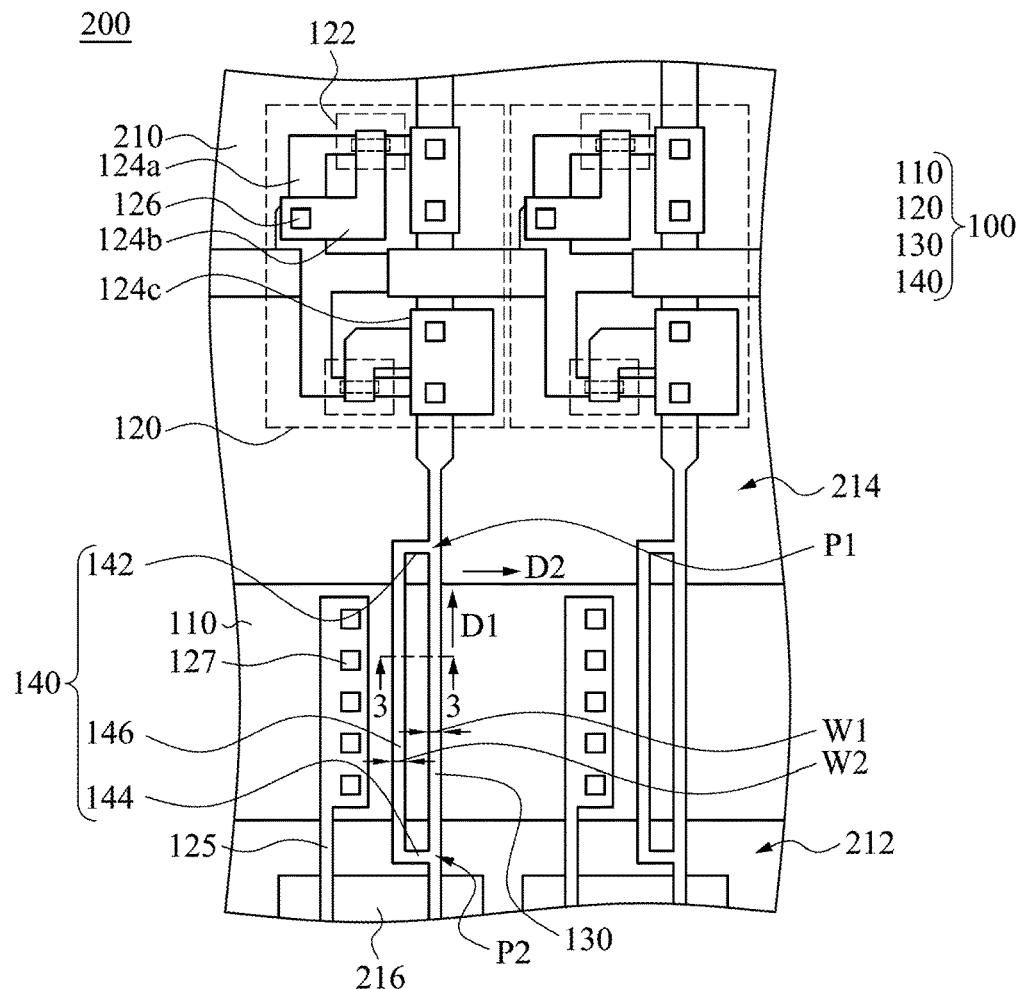
FIG. 2 is a partially enlarged view of a peripheral area of the display device shown in FIG. 1.

FIG. 1 is a top view of a display device 200 according to one embodiment of the present invention. FIG. 2 is a partially enlarged view of a peripheral area 214 of the display device 200 shown in FIG. 1. As shown in FIG. 1 and FIG. 2, a display device 200 includes a substrate 210 and a peripheral circuit structure 100. The substrate 210 has a display area 212 and the peripheral area 214 that surrounds the display area 212. The display area 212 has at least one pixel unit 216. The peripheral circuit structure 100 is located on the peripheral area 214 of the substrate 210. In addition, the peripheral circuit structure 100 may be a signal input end or a signal terminal of the display device 200 that are respectively at two opposite sides of the display area 212. For example, the peripheral circuit structure 100 may be disposed on the left peripheral area 214 of FIG. 1 (e.g., the signal input end), and may optionally be disposed on the right peripheral area 214a of FIG. 1 (e.g., the signal terminal), and the present invention is not limited in this regard.

Figure 3:
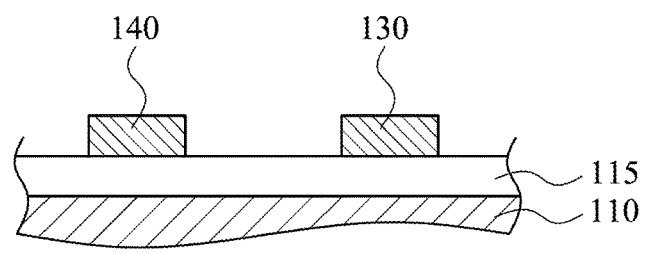
FIG. 3 is a cross-sectional view of a peripheral circuit structure taken along line 3-3 shown in FIG. 2.

FIG. 3 is a cross-sectional view of the peripheral circuit structure 100 taken along line 3-3 shown in FIG. 2. As shown in FIG. 2 and FIG. 3, the peripheral circuit structure 100 includes a common electrode layer 110, at least one ESD protection diode 120, an isolation layer 115, a first conductive line 130, and at least one second conductive line 140. The common electrode layer 110 is used to provide common electrode potential (Vcom), and is electrically connected to the pixel unit 216. For example, the common electrode layer 110 is electrically connected to the pixel unit 216 through a conductive line 125 and a conductive through via 127. The common electrode layer 110 is located between the ESD protection diode 120 and the pixel unit 216. The isolation layer 115 covers the common electrode layer 110. The first conductive line 130 is located on the isolation layer 115 such that the isolation layer 115 is located between the first conductive line 130 and the common electrode layer 110. The first conductive line 130 is over the common electrode layer 110. Two ends of the first conductive line 130 are respectively electrically connected to the ESD protection diode 120 and the pixel unit 216. The second conductive line 140 is located on the isolation layer 115 such that the isolation layer 115 is located between the second conductive line 140 and the common electrode layer 110. The second conductive line 140 is over the common electrode layer 110. Two ends of the second conductive line 140 are respectively located on positions that are between the ESD protection diode 120 and the common electrode layer 110 and between the pixel unit 216 and the common electrode layer 110, and the two ends of the second conductive line 140 are electrically connected to the first conductive line 130 to respectively form a first junction P1 and a second junction P2. Therefore, the first conductive line 130 and the second conductive line 140 are connected in parallel.

The second conductive line 140 is substantially U-shaped when viewed from above. The second conductive line 140 has a first section 142, a second section 144, and a third section 146. Two ends of the third section 146 respectively adjoin an end of the first section 142 and an end of the second section 144, so that a combination of the first section 142, the second section 144, and the third section 146 is substantially U-shaped when viewed from above. In this embodiment, the third section 146 of the second conductive line 140 is substantially parallel to the first conductive line 130. The first section 142 and the second section 144 of the second conductive line 140 are substantially perpendicular to the first conductive line 130 and the third section 146 of the second conductive line 140.

Furthermore, the third section 146 of the second conductive line 140 overlaps the common electrode layer 110, and the first section 142 and the second section 144 of the second conductive line 140 do not overlap the common electrode layer 110. In this embodiment, a longitudinal direction D1 of each of the first conductive line 130 and the third section 146 of the second conductive line 140 is substantially perpendicular to a longitudinal direction D2 of the common electrode layer 110, but the present invention is not limited in this regard.

In this embodiment, the width W1 of the first conductive line 130 is substantially the same as the width W2 of the second conductive line 140. Compared a configuration having the first conductive line 130 and the second conductive line 140 with another configuration having the first conductive line 130 and no second conductive line 140, the configuration having the first conductive line 130 and the second conductive line 140 does not form additional resistance-capacitance loading (RC Loading) because the first conductive line 130 and the second conductive line 140 are connected in parallel and have the same width. Although the resistance value of the configuration of FIG. 2 is halved, the capacitance value of the configuration becomes doubled.

In this embodiment, the ESD protection diode 120 includes two thin film transistors 122 therein, and may have conductive lines 124a, 124b, and 124c that are at different layers. These conductive lines 124a, 124b, and 124c may be electrically connected with each other through conductive through vias 126.

It is to be noted that the connection relationships of the elements described above will not be repeated hereinafter. In the following description, methods of repairing the peripheral circuit structure 100 that is subjected to the process defect of the isolation layer 115 or ESD damage will be described.

Figure 4:
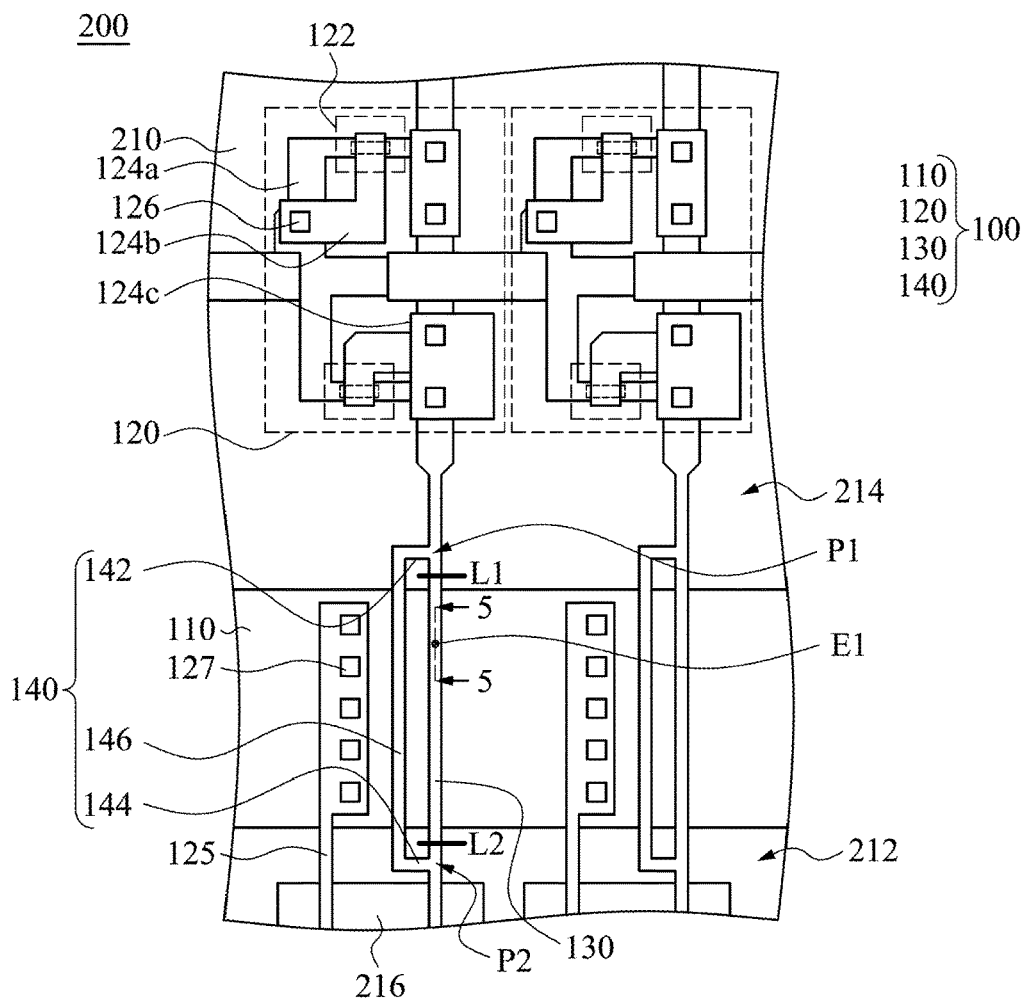
FIG. 4 is a top view of a first conductive line shown in FIG. 2, in which gaps are formed in the first conductive line when the first conductive line has a defect.
Figure 5:
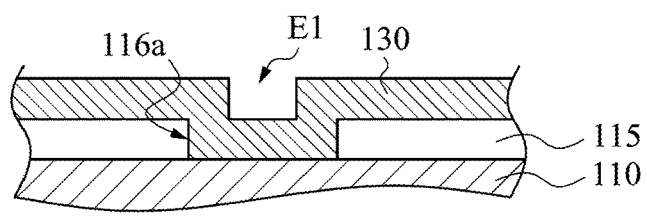
FIG. 5 is a cross-sectional view of the first conductive line taken along line 5-5 shown in FIG. 4.

FIG. 4 is a top view of the first conductive line 130 shown in FIG. 2, in which gaps L1 and L2 are formed in the first conductive line 130 when the first conductive line 130 has a defect E1. FIG. 5 is a cross-sectional view of the first conductive line 130 taken along line 5-5 shown in FIG. 4. As shown in FIG. 4 and FIG. 5, when the first conductive line 130 is subjected to the process defect of the isolation layer 115 or ESD damage (e.g., the defect E1 of FIG. 4), the isolation layer 115 may form a through hole 116a, and hence the first conductive line 130 enters the through hole 116a to be in contact with the common electrode layer 110, thereby forming an electrical conduction between the first conductive line 130 and the common electrode layer 110 to cause a short circuit.

Since the peripheral circuit structure 100 has the second conductive line 140 that is over the common electrode layer 110, and the two ends of the second conductive line 140 are electrically connected to the first conductive line 130 to respectively form the first junction P1 and the second junction P2, the second conductive line 140 can be used as a spare conductive line when an electrical conduction is formed between the first conductive line 130 and the underlying common electrode layer 110. In the aforementioned situation, through laser cutting, the gap L1 may be formed in the first conductive line 130 that is between the first junction P1 and the common electrode layer 110, and another gap L2 may be formed in the first conductive line 130 that is between the second junction P2 and the common electrode layer 110. As a result, an electric current transmitted between the ESD protection diode 120 and the pixel unit 216 merely passes through the second conductive line 140 to overstride the common electrode layer 110, and not pass through the first conductive line 130 above the common electrode layer 110. In other words, the electric current does not pass through the first conductive line 130 that has the defect E1 and is between the gap L1 and the gap L2.

Through the aforementioned repairing method, the common electrode layer 110 is prevented from affecting the display of the pixel unit 216 even if the formation of the defect E1. Moreover, since the distance for laser cutting is shorter (merely greater than or equal to the width of the first conductive line 130), the successful rate of repair can be improved.

In addition, when each of two first conductive lines 130 has the defect E1, the aforementioned repairing method may still be used to form the gaps L1 and L2 in each of the two first conductive lines 130, and does not cause a region of the common electrode layer 110 between the two first conductive lines 130 to be insulated with other conductive lines. In other words, the common electrode layer 110 under other normal first and second conductive lines 130 and 140 that are between the two damaged first conductive lines 130 can still normally functions.

Figure 6:
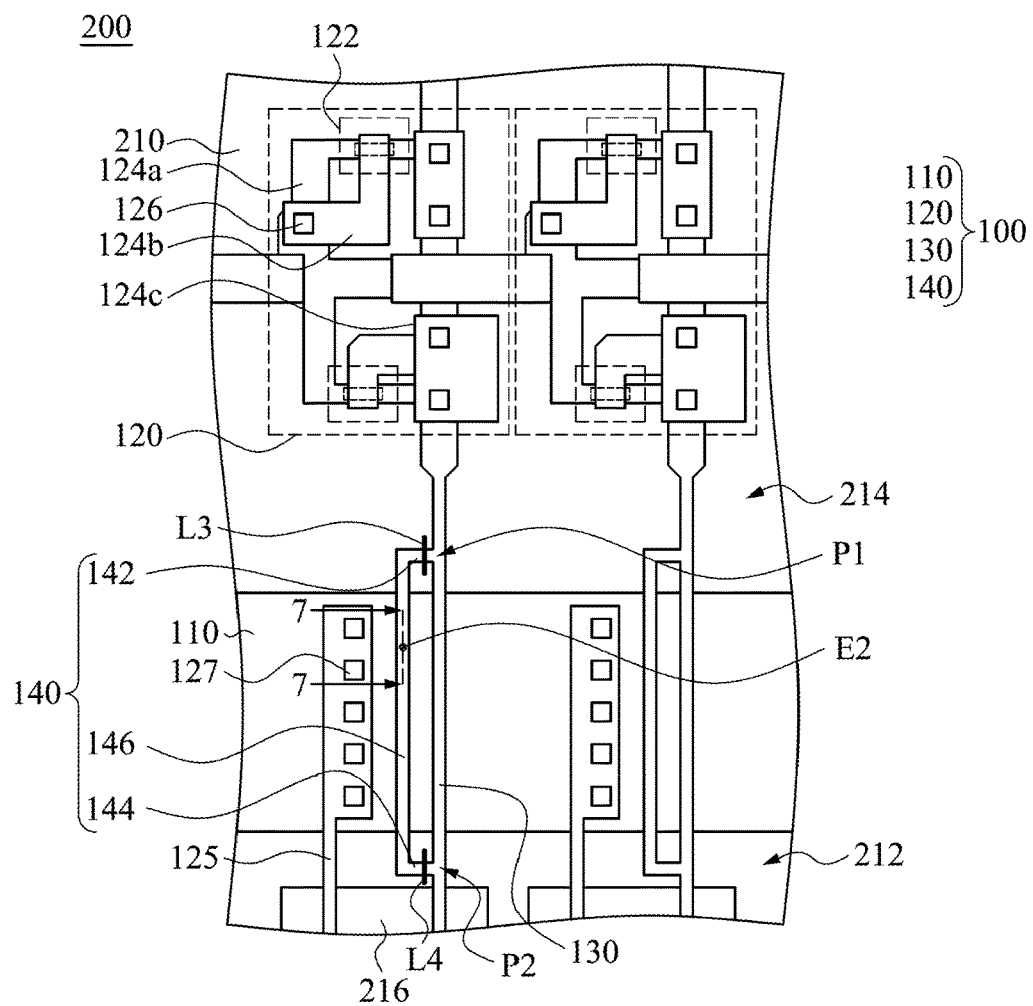
FIG. 6 is a top view of a second conductive line shown in FIG. 2, in which gaps are formed in the second conductive line when the second conductive line has a defect.
Figure 7:
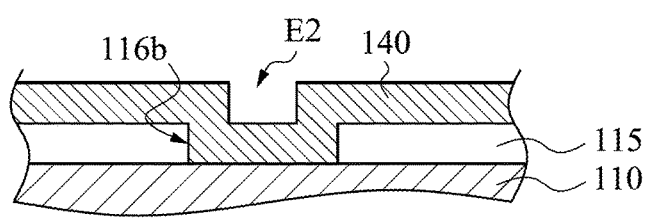
FIG. 7 is a cross-sectional view of the second conductive line taken along line 7-7 shown in FIG. 6.

FIG. 6 is a top view of the second conductive line 140 shown in FIG. 2, in which gaps L3 and L4 are formed in the second conductive line 140 when the second conductive line 140 has a defect E2. FIG. 7 is a cross-sectional view of the second conductive line 140 taken along line 7-7 shown in FIG. 6. As shown in FIG. 6 and FIG. 7, when the second conductive line 140 is subjected to the process defect of the isolation layer 115 or ESD damage (e.g., the defect E2 of FIG. 6), the isolation layer 115 may form a through hole 116b, and hence the second conductive line 140 enters the through hole 116b to be in contact with the common electrode layer 110, thereby forming an electrical conduction between the second conductive line 140 and the common electrode layer 110 to cause a short circuit.

Since the peripheral circuit structure 100 has the second conductive line 140 that is over the common electrode layer 110, and two ends of the second conductive line 140 are electrically connected to the first conductive line 130 to respectively form the first junction P1 and the second junction P2, the first conductive line 130 can be used as a spare conductive line when an electrical conduction is formed between the second conductive line 140 (e.g., the third section 146) and the underlying common electrode layer 110. In the aforementioned situation, through laser cutting, the gap L3 may be formed in the second conductive line 140 that is between the first junction P1 and the third section 146, and another gap L4 may be formed in the second conductive line 140 that is between the second junction P2 and the third section 146. As a result, an electric current transmitted between the ESD protection diode 120 and the pixel unit 216 merely passes through the first conductive line 130 to overstride the common electrode layer 110, and not pass through the second conductive line 140 above the common electrode layer 110. In other words, the electric current does not pass through the second conductive line 140 that has the defect E2 and is between the gap L3 and the gap L4.

Figure 8:
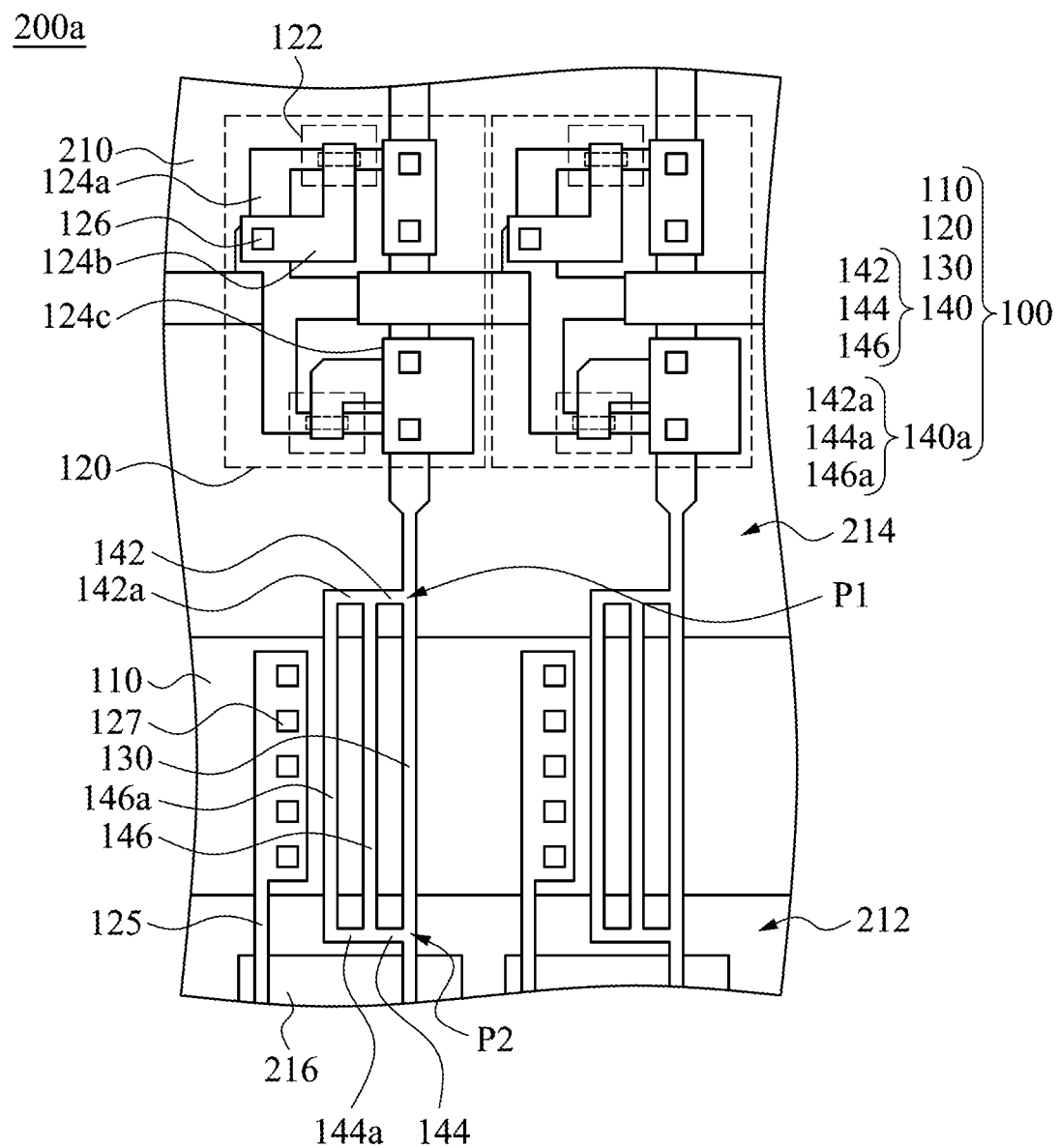
FIG. 8 is a partially enlarged view of a peripheral area of a display device according to one embodiment of the present invention.

FIG. 8 is a partially enlarged view of a peripheral area 214 of a display device 200a according to one embodiment of the present invention. The display device 200a includes a substrate 210 and a peripheral circuit structure 100a. The peripheral circuit structure 100a includes a common electrode layer 110, at least one ESD protection diode 120, an isolation layer 115 (see FIG. 3), a first conductive line 130, and second conductive lines 140 and 140a. The difference between this embodiment and the embodiment shown in FIG. 2 is that the peripheral circuit structure 100a has two second conductive lines 140 and 140a. In this embodiment, the first conductive line 130 and the second conductive lines 140 and 140a are over the common electrode layer 110. The second conductive line 140a has a first section 142a, a second section 144a, and a third section 146a. Two ends of the third section 146a respectively adjoin an end of the first section 142a and an end of the second section 144a, so that the second conductive line 140a is substantially U-shaped when viewed from above. The first conductive line 130 and the second conductive lines 140 and 140a have the same width and are connected in parallel. Compared a configuration having the first conductive line 130 and the two second conductive lines 140 and 140a with another configuration having the first conductive line 130 and no second conductive line, the configuration having the first conductive line 130 and the second conductive lines 140 and 140a does not form additional resistance-capacitance loading (RC Loading). Although the resistance value of the configuration of FIG. 8 is one-third, the capacitance value of the configuration becomes tripled.

However, the present invention is not limited to the number of second conductive lines. In alternative embodiments, the peripheral circuit structure may have more second conductive lines to be as spare conductive lines.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A display device, comprising:
    a substrate having a display area and a peripheral area, wherein the display area has at least one pixel unit; and
    a peripheral circuit structure located on the peripheral area of the substrate, and comprising:
        a common electrode layer electrically connected to the pixel unit;
        at least one ESD protection diode, wherein the common electrode layer is located between the ESD protection diode and the pixel unit;
        an isolation layer covering the common electrode layer;
        a first conductive line located on the isolation layer and over the common electrode layer, wherein two ends of the first conductive line are respectively electrically connected to the ESD protection diode and the pixel unit; and
        at least one second conductive line located on the isolation layer and over the common electrode layer, wherein two ends of the second conductive line are respectively located on positions that are between the ESD protection diode and the common electrode layer and between the pixel unit and the common electrode layer, and the two ends of the second conductive line are electrically connected to the first conductive line to respectively form a first junction and a second junction.

2. The display device of claim 1, wherein the second conductive line is substantially U-shaped when viewed from above.

3. The display device of claim 1, wherein the isolation layer is located between the first conductive line and the common electrode layer, and is located between the second conductive line and the common electrode layer.

4. The display device of claim 1, wherein the second conductive line has a first section, a second section, and a third section, and two ends of the third section respectively adjoin an end of the first section and an end of the second section, and the third section overlaps the common electrode layer, and the first section and the second section do not overlap the common electrode layer.

5. The display device of claim 4, wherein the third section of the second conductive line is substantially parallel to the first conductive line.

6. The display device of claim 4, wherein the first section and the second section of the second conductive line are substantially perpendicular to the first conductive line and the third section of the second conductive line.

7. The display device of claim 4, wherein the isolation layer has a through hole, and the second conductive line is in contact with the common electrode layer that is in the through hole, and the second conductive line has two gaps that are respectively between the first junction and the third section and between the second junction and the third section.

8. The display device of claim 1, wherein the isolation layer has a through hole, and the first conductive line is in contact with the common electrode layer that is in the through hole, and the first conductive line has two gaps that are respectively between the first junction and the common electrode layer and between the second junction and the common electrode layer.

9. The display device of claim 1, wherein a width of the first conductive line is substantially the same as a width of the second conductive line.

10. The display device of claim 1, wherein a longitudinal direction of the first conductive line is substantially perpendicular to a longitudinal direction of the common electrode layer.

11. The display device of claim 1, wherein the ESD protection diode comprises two thin film transistors therein.

12. The display device of claim 1, wherein the peripheral circuit structure is a signal input end or a signal terminal of the display device.

13. A peripheral circuit structure located on a peripheral area of a substrate, wherein the peripheral area surrounds a display area of the substrate, and the peripheral circuit structure comprises:
    a common electrode layer electrically connected to at least one pixel unit of the display area;
    at least one ESD protection diode, wherein the common electrode layer is located between the ESD protection diode and the pixel unit;
    an isolation layer covering the common electrode layer;
    a first conductive line located on the isolation layer and over the common electrode layer, wherein two ends of the first conductive line are respectively electrically connected to the ESD protection diode and the pixel unit; and
    at least one second conductive line located on the isolation layer and over the common electrode layer, wherein two ends of the second conductive line are respectively located on positions that are between the ESD protection diode and the common electrode layer and between the pixel unit and the common electrode layer, and the two ends of the second conductive line are electrically connected to the first conductive line to respectively form a first junction and a second junction.

* * * * *